United States Patent [19]
Fujiwara

[11] Patent Number: 5,767,473
[45] Date of Patent: Jun. 16, 1998

[54] METHOD AND APPARATUS FOR ELECTRICAL DISCHARGE MACHINING WITH AN ADSORPTION DEVICE AND AGITATOR IN THE WORK TANK

[75] Inventor: Katsuhide Fujiwara, Yokohama, Japan

[73] Assignee: Sodick Co., Ltd., Yokohama, Japan

[21] Appl. No.: 454,136

[22] PCT Filed: Oct. 7, 1994

[86] PCT No.: PCT/JP94/01685

§ 371 Date: Aug. 14, 1995

§ 102(e) Date: Aug. 14, 1995

[87] PCT Pub. No.: WO95/10383

PCT Pub. Date: Apr. 20, 1995

[30] Foreign Application Priority Data

Oct. 8, 1993 [JP] Japan ................ 5-285484

[51] Int. Cl.⁶ .................................................. B23H 1/10
[52] U.S. Cl. .................................................. 219/69.14
[58] Field of Search ................... 219/69.11, 69.14, 219/69.17, 222, 243, 280, 695

[56] References Cited

U.S. PATENT DOCUMENTS

| | | | |
|---|---|---|---|
| 3,477,948 | 11/1969 | Inoue | 210/695 |
| 4,387,286 | 6/1983 | Inoue | 219/69.14 |
| 4,392,042 | 7/1983 | Inoue | 219/69.14 |
| 4,408,113 | 10/1983 | Inoue | 219/69.17 |
| 4,551,602 | 11/1985 | Inoue et al. | 219/69.14 |
| 5,243,168 | 9/1993 | Wada et al. | 219/69.14 |

FOREIGN PATENT DOCUMENTS

| | | | |
|---|---|---|---|
| 0098711 | 1/1984 | European Pat. Off. | |
| 3530536 | 3/1987 | Germany | |
| 59-1124 | 1/1984 | Japan | 219/69.14 |
| 61-219533 | 9/1986 | Japan | 219/69.14 |
| 62-259717 | 11/1987 | Japan | |
| 1-140925 | 6/1989 | Japan | 219/69.14 |
| 3-7945 | 1/1991 | Japan | |
| 3-15648 | 2/1991 | Japan | |
| 4-315523 | 11/1992 | Japan | |
| WO88/07428 | 10/1988 | WIPO | |

*Primary Examiner*—Geoffrey S. Evans
*Attorney, Agent, or Firm*—McDermott, Will & Emery

[57] ABSTRACT

A magnetic adsorption device in a work tank removes machining chips produced as a result of electrical discharge machining so that chips will not enter the gap formed between the tool electrode and the workpiece, ensuring stable machining. When using a dielectric fluid into which a powdered material has been mixed to machine the workpiece, an agitator is used which prevents the settling of the powdered material. The agitator prevents the chips from settling and are prevented from becoming suspended in the dielectric fluid along with the powdered material. The adsorption device preferably contains multiple elongated columnar magnetic bodies positioned to surround the workpiece about its sides.

24 Claims, 3 Drawing Sheets

METHOD AND APPARATUS FOR ELECTRICAL DISCHARGE MACHINING WITH AN ADSORPTION DEVICE AND AGITATOR IN THE WORK TANK

TECHNICAL FIELD

The present invention relates to an electric discharge machine and method which uses a tool electrode to perform electric discharge machining on a workpiece. More specifically, the present invention relates to an electric discharge machine and method which use a machining fluid in which a powder is mixed into an oil-based dielectric fluid.

BACKGROUND OF THE INVENTION

In general, electric discharge machines include a work tank which contains the workpiece, a fluid supply device which supplies a dielectric fluid such as kerosene to the work tank, and a power supply which supplies power to the space between the tool electrode and the workpiece known as the "gap". Electric discharge machining occurs at the gap, in the work tank which is filled with the dielectric fluid. Technology is known whereby, for the purpose of improving surface roughness, a powder material composed of a semiconductor such as polycrystal silicon, or a good electric conductor such as aluminum or graphite, or an inorganic oxide or inorganic carbide, with a particle diameter of between 1μm and 50μm, is mixed into the dielectric fluid. On electric discharge machines which make use of such powder-bearing fluids, a fluid supply device is provided which can, in accordance with the intended purpose of machining, selectively supply either powder-bearing fluid or non-powder-bearing fluid. Such electric discharge machines generally also require two additional devices.

First, a device is provided which separates machining waste produced by electric discharge machining from the powder-bearing fluid. For example, a large specific-gravity centrifugal separator may be provided for this purpose. Also, a device containing a magnetic material is provided in an appropriate part of the fluid supply device, such as the fluid reservoir tank or fluid circulation path.

Second, because it is important from the standpoint of machined surface quality and machining performance to maintain the concentration of powdered material in the dielectric fluid in the work tank at a specified concentration, a device is provided which prevents settling of the powdered material. Typically an agitator is provided in the work tank to agitate the fluid.

The agitator prevents the settling of powdered material by agitating the fluid in the work tank, but at the same time it inhibits the settling of machining chips produced by the machining process. The agitator can also cause machining chips which had settled to become resuspended in the fluid. As a result, the machining chips suspended in the fluid can enter the machining area, where it will have undesirable effects on the electric discharge machining process.

The purpose of the present invention is to provide an electric discharge machine and method which reliably removes machining chips suspended in the fluid by the agitator.

Other purposes, advantages, and new characteristics of the present invention are partially discussed in the explanation which follows below, and will be partially apparent to practitioners of the art upon consideration of the explanation below, or practitioners of the art will be able to learn of these through application of the invention. The purposes and advantages of the present invention will be realized and achieved by the means and instrumentalities set forth in the appended claims.

DISCLOSURE OF THE INVENTION

In order to achieve the above purposes, there is provided, in accordance with the present invention, an electric discharge machine, which machines a workpiece by generating an electric discharge across a gap formed between a workpiece and a tool electrode, both of which are positioned in a work tank filled with a dielectric fluid into which a powdered material is mixed. The electric discharge machine includes an agitator, which agitates the dielectric fluid and prevents the settling of powdered material in the fluid, and a magnetic adsorption device, which is positioned in the work tank and which adsorbs machining chips produced by the electric discharge machining process.

The magnetic adsorption device will preferably be positioned so that it faces the flow of dielectric fluid produced by the agitator in the work tank. The magnetic adsorption device may also be positioned so that it surrounds the workpiece about its sides. It is preferable that the magnetic adsorption device include multiple magnetic pieces and retainers which maintain a parallel interval between those magnetic pieces. It is also preferable that the multiple magnetic pieces be formed in a cylindrical or flat shape.

Furthermore, an electric discharge machining method according to the present invention, which uses an electric discharge machine for machining a workpiece positioned in a work tank filled with dielectric fluid by electric discharges using a tool electrode, includes a step in which the dielectric fluid is agitated in order to prevent settling of the powdered material, a step in which the workpiece is machined by generating electric discharges in the gap formed between the workpiece and the tool electrode, and a step in which the machining chips produced by the electric discharges is adsorbed using magnetic bodies.

OPTIMUM CONFIGURATION FOR IMPLEMENTING THE INVENTION

Figure 1:
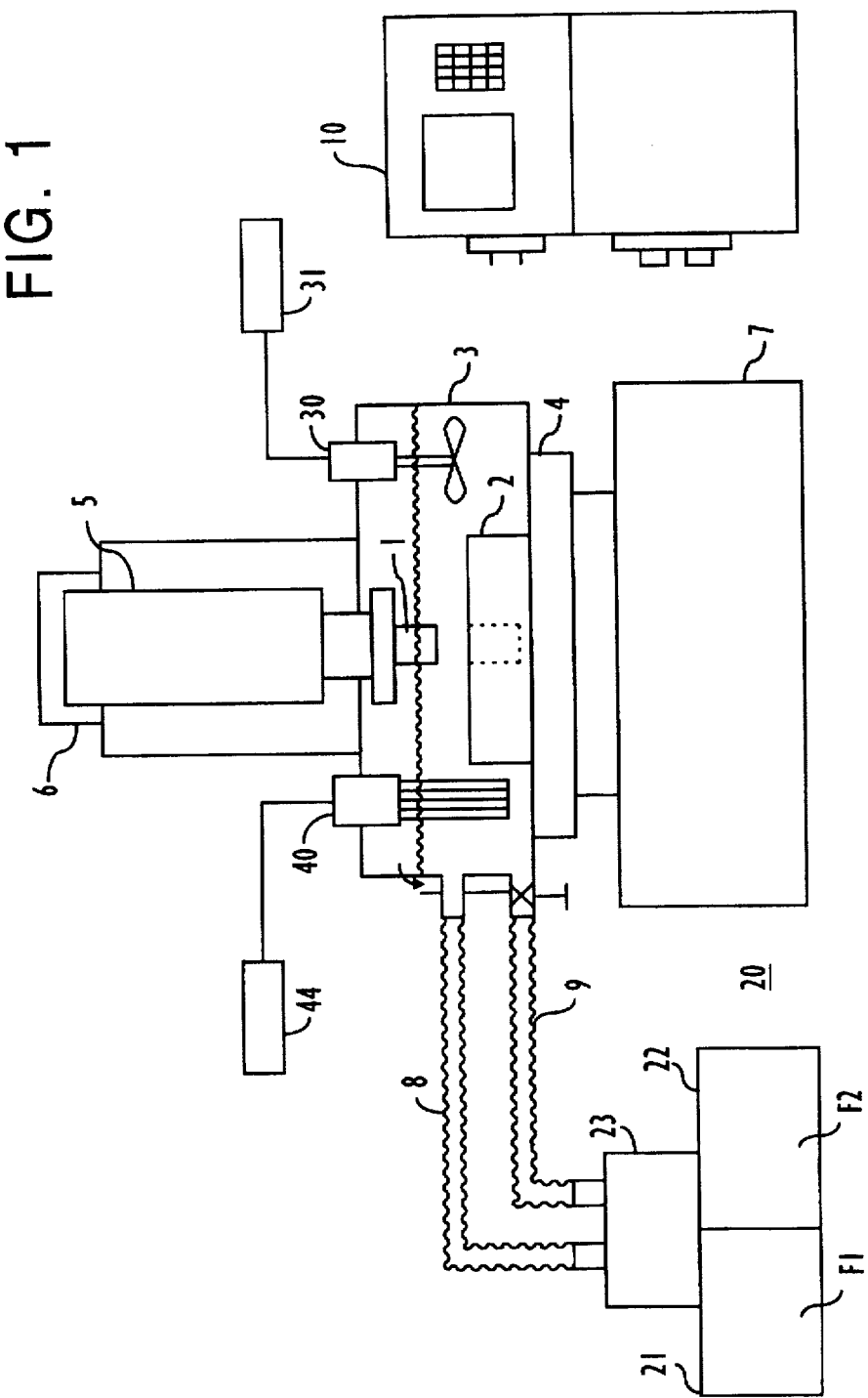
FIG. 1 is an overview diagram illustrating an exemplary embodiment of an electric discharge machine according to the present invention.

The construction of the present invention will now be described with reference to the drawings. FIG. 1 is an overview drawing illustrating an embodiment of the electric discharge machine according to the present invention. The electric discharge machine includes a bed 7 and an XY cross-table 4 attached to the bed. Work tank 3 is fastened to the XY cross-table 4 in such a way that it can be filled with fluid. A column 6 stands upright on the bed 7, and is positioned behind the work tank 3.

A servo-head 5 is attached to the column 6. A tool electrode 1 is fastened to the servo-head 5 by an appropriate electrode holder and faces the workpiece 2, which is affixed to the XY cross-table 4. The servo-head 5, includes a Z-axis motor, moves the tool electrode 1 in a direction perpendicular to the XY cross table 4.

The electric discharge machine further includes a combination power supply/control unit 10 which supplies power to the gap formed between the tool electrode 1 and the workpiece 2. A control unit 10 controls the X-axis motor and Y-axis motor (not shown) which drive the XY cross-table 4 and cause the workpiece 2 to move relative to the tool electrode 1 in the horizontal plane. The control unit 10 also controls the Z-axis motor.

The electric discharge machine further includes a fluid supply unit 20, which supplies a mineral oil-based machining fluid to the work tank 3 through a flexible tube 8. A flexible tube 9 is provided which discharges the fluid from the work tank 3 to the fluid supply unit 20. The fluid supply unit 20 includes a fluid supply section 21, which stores non-powder-bearing dielectric fluid F1 and supplies the fluid F1 to the work tank 3, and a supply section 22, which stores powder-bearing dielectric fluid F2 and supplies the fluid F2 to the work tank 3. The fluid supply unit 20 also includes a switch 23 which selectively supplies the fluids F1 or F2 to the work tank 3 and selectively returns fluid discharged from the work tank 3 to the fluid supply units 21 or 22. The switch 23 is controlled by a signal from the control unit 10.

An agitator 30 is provided in order to prevent the settling of the powdered material. The agitator 30 includes a drive motor and an agitation blade attached to the end of the driveshaft thereof. The agitator 30 may, for example, be attached to the side wall of the work tank 3 using an appropriate fastener. In the illustrated embodiment, the agitation blade is formed in a propeller shape, and is positioned within the fluid-filled tank. A drive source 31 is connected to the drive motor and is activated in response to a signal from the control unit 10. An appropriate number of additional agitators may also be erected in order to reliably prevent the powdered material from settling.

A machining chip adsorption device 40 which contains, for example, multiple magnetic pieces such as permanent magnets or electromagnets, is also provided in order to separate the machining chips produced by electric discharge machining. These magnetic pieces may be formed as cylinders having a diameter of approximately 1~2 cm, and there are multiple magnetic poles on the perimeter surface thereof. The adsorption device 40 also has retainers which suspend the magnetic pieces from their top ends in such a way that the multiple magnetic pieces are arrayed in a line perpendicular to and at an interval from the XY cross table 4 and parallel to one another. The magnetic pieces in a row are suspended in the work tank 3 in such a way as to cross the fluid flow stream produced by the agitator 30 and in a such a way that the bottom ends of the magnetic pieces virtually reach the bottom of work tank 3. When the adsorption device 40 includes electromagnets, a controller 44 is provided to energize and denergize the electromagnets.

Figure 2:
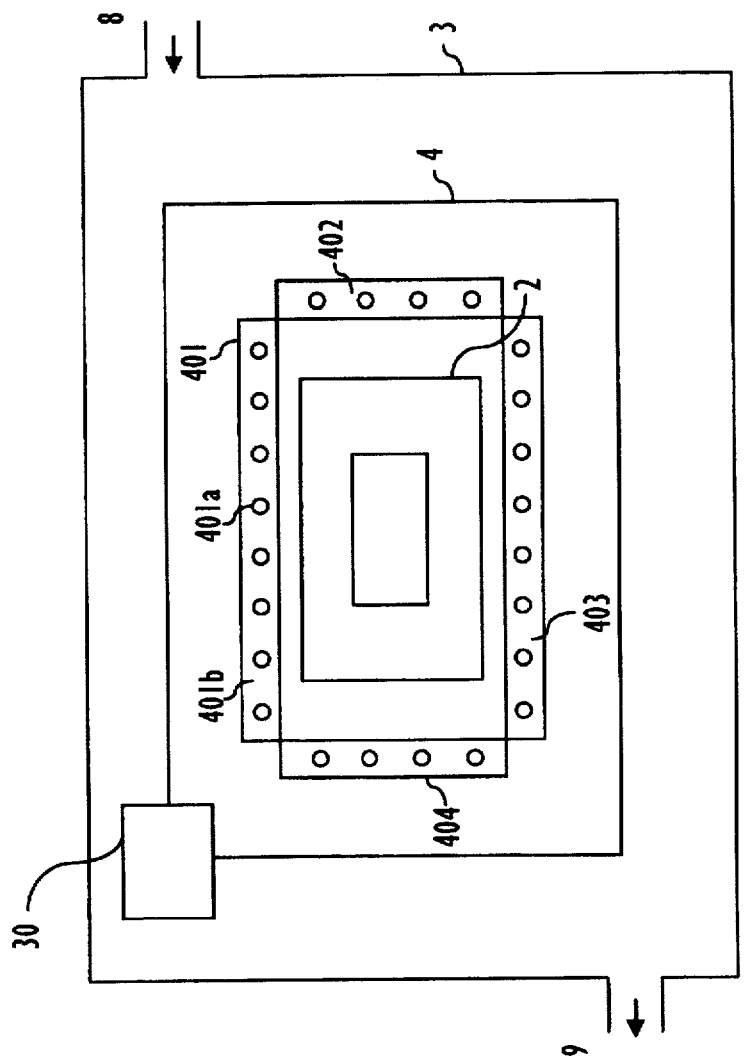
FIG. 2 is an external view illustrating another example of a machining chip adsorption device.

FIG. 2 is an top view of work tank 3. It illustrates an embodiment of an electric discharge machine provided with multiple adsorption devices. In the illustrated embodiment, plural machining chip adsorption devices 401, 402, 403, and 404 are positioned on the XY cross table 4 in the work tank 3 in such a way as to surround the workpiece 2 about its sides. Parts identical to those shown in FIG. 1 are assigned the same reference numerals, and an explanation thereof is omitted. The adsorption device 401 includes multiple cylindrical electromagnets 401a, which are of sufficient length that they virtually reach from the bottom of work tank 3 to the fluid surface, and retainers 401b, which hold the lower ends of the electromagnets 401a and are arrayed on the XY cross table 4. The magnetic pieces 401a are, for example, electromagnets with cores formed of laminated silicone steel plate. The electromagnets 401a are held parallel to one another and perpendicular to and at an interval with respect to the XY cross table 4. Electromagnets 401a may, as with the adsorption device 40 shown in FIG. 1, be suspended using appropriate retainers to hold the top ends thereof. In order to surround workpiece 2 about its sides, the electromagnets 401a may also be arrayed parallel to one another and parallel to and at an interval with respect to the XY cross table 4 using cable or wire so as to form a folding curtain. Preferably, multiple magnetic pieces 401a will be arrayed so that a magnetic field is generated parallel to the axes of the magnetic pieces and, further, so as to form some degree of magnetic field between the magnetic pieces themselves. The other adsorption devices 402, 403, and 404 are typically of the same construction as the adsorption device 401.

FIGS. 3A, 3B, 3C, and 3D are section drawings depicting examples of the magnetic pieces of a machining chip adsorption device.

Figure 3A:
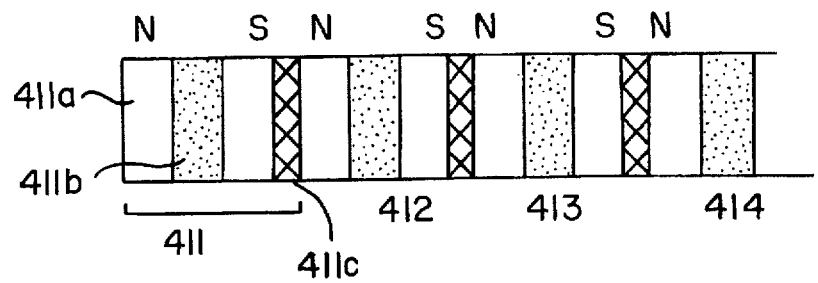
FIG. 3A is a section depicting an example of the magnetic pieces in a machining chip adsorption device.

The magnetic piece 410 illustrated in FIG. 3A has multiple electromagnets 411, 412, 413, and 414 connected by a non-magnetic body. The electromagnet 411 includes a rotating I-shaped core 411a, a coil 411b wound around the trunk of the core 411a, and a non-magnetic body 411c. A magnetic field is formed at both ends of rotating I-shaped core 411a, and also between the opposite poles of an electromagnet 412 which, interposed by a non-magnetic body, adjoins it.

The core 411a may also be formed in a hollow cylindrical tube shape, with rod-shaped permanent magnets inserted into the hollow portion thereof. In this case, the hollow gap around the core 411a will be filled with a non-magnetic body such as plastic rather than with the coil 411b. A cylindrical part formed of thin stainless steel or plastic is fashioned, into which magnetic piece 410 is inserted. Machining chips adsorbed on the outer surface of the cylindrical part can be easily peeled off when magnetic piece 410 is extracted from this cylindrical part.

Figure 3C:
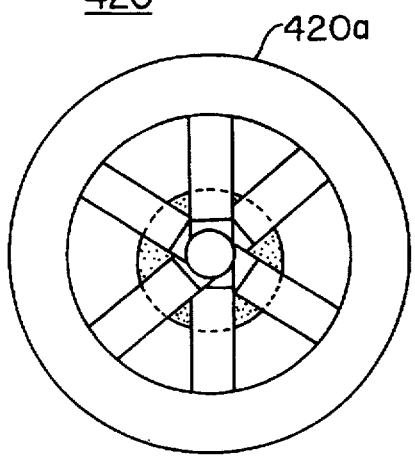
FIGS. 3B and 3C are sections depicting another example of the magnetic pieces in a machining chip adsorption device.
Figure 3B:
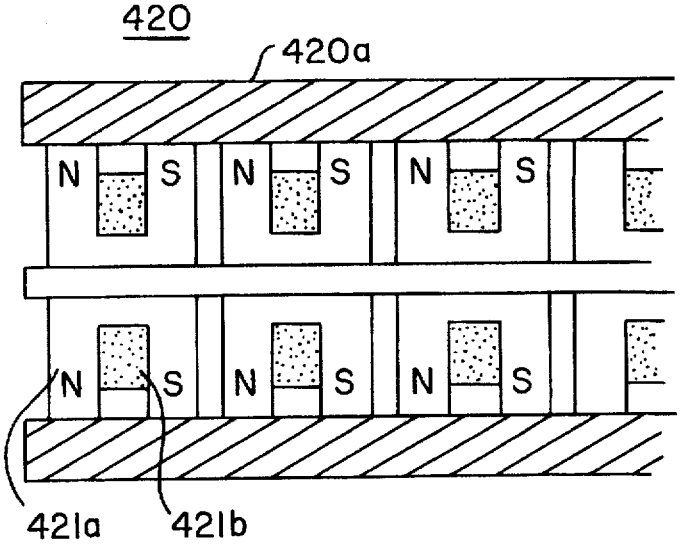

The elongated cylindrical magnetic piece 420 illustrated in FIGS. 3B and 3C includes a cylindrical piece 420a comprising a non-magnetic body. The magnetic piece 420 further includes plural cores 421a, each comprising a squared-off "C"-shaped silicon steel plate laminate—in the example illustrated, 6 such cores 421a are radially arrayed in 60 degree divisions around the axis of the cylindrical piece 420a as depicted in FIG. 3C. A coil 421bis wound around each of the plurality of 6 cores 421ato form an approximately disk-shaped electromagnet in which the lines of magnetic force extend radially. Several of these electromagnets may be stacked up along the aforementioned axis to constitute an elongated rod shape, and an appropriate non-magnetic body may be used to fill the spaces between the cores 421a and the electromagnets and inserted into the cylindrical piece 420a. Alternatively, a permanent magnet constitution may be adopted in which permanent cylindrical magnets are inserted coaxially into the bottom of the 6 cores in place of the coil 421b.

Figure 3D:
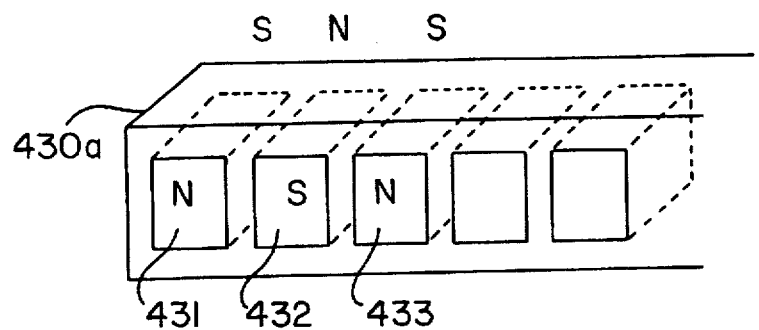
FIG. 3D is an external view depicting still another example of the magnetic pieces in a machining chip adsorption device.

In the elongated square pillar-shaped magnetic piece 430 illustrated in FIG. 3D, multiple permanent magnets 431, 432, 433, etc. are positioned within a casing piece 430a in such a way that magnetic poles are generated on the side walls of the elongated rod-shaped body. This assembly is inserted into a thin-walled container, and removal of adsorbed machining chips is accomplished by extracting the magnet 430 from the aforementioned container. A columnar shape using electromagnets was adopted in the embodiment of FIG. 2, but as shown in FIG. 3D, the device may also be formed as an elongated square pillar, plate, or columnar shape, using multiple small permanent magnets internally and covering them with resin, etc.

Next the operation of the electric discharge machine depicted in FIG. 1 will be described.

First, after affixing the workpiece 2 to the table 4, fluid F1 is supplied to the work tank 3 in accordance with a command signal from the control unit 10, and the workpiece 2 is submerged in the fluid F1. A course removal operation is then performed on the workpiece 2 under the requisite machining conditions. Multiple machining conditions may be sequentially changed as required to gradually finish the workpiece to the requisite machining dimensions and machining surface roughness.

In this rough removal process, the fluid F1 is supplied constantly from the fluid supply section 21 to the work tank 3; the fluid F1 in the work tank 3 overflows, forming a relatively slow machining fluid flow which returns to the fluid supply section 21. By jetting the fluid F1 into or suctioning it from the gap through the path formed in the tool electrode 1 or the workpiece 2, machining chips produced at the gap formed between the tool electrode 1 and the workpiece 2 as a result of electric discharge machining are removed. The fluid F1 can also be jetted into the gap using a flexible hose equipped with a nozzle. Generally, in order to remove machining chips from the gap, a so-called "pumping" process is effected in which electrode 1 is cyclically moved a specified distance in a direction away from the workpiece 2 and then immediately moved back into proximity with the workpiece 2.

Upon completion of the rough machining process, the work piece 2 is finished using the fluid F2. First, the fluid F1 is discharged from the work tank 3 to the fluid supply section 21 through the tube 9. In accordance with a command signal from the control unit 10, the fluid F2 is supplied from the fluid supply section 22 to the work tank 3 through the tube 8, and the workpiece 2 is submerged in the fluid F2.

When the fluid F2 is supplied to the work tank 3 and the fluid surface reaches a specified level, a signal is sent from a fluid surface detector (not shown) to the control unit 10. The control unit 10 drives the agitator 30 while at the same time turning on the power supply in controller 44, so that a magnetic field is generated on the surface magnetic pole portion of adsorption device 40 and an adsorbing magnetic field is formed. When the agitator 30 agitates the fluid F2 in the work tank 3, the machining chips which had settled as residue in the work tank 3 are churned up by the agitation-induced fluid flow, and become suspended material. When the suspended machining chips start to pass between the magnets of the adsorption device 40, they are attracted by the magnetic field present in those spaces and are adsorbed on the surface magnetic polar portions of the magnetic columns. Therefore the machining chips which create the difficulties described above will not become interposed in the machining area. The workpiece 2 can be machined under requisite machining conditions in such a way that required dimensional accuracies and surface roughness are achieved. The adsorption device 40 should preferably be activated during the finishing processing so as to remove machining chips suspended in the fluid F2.

The purpose of the present invention is not limited to the precise disclosed forms. Clearly there are many improvements and variations possible in light of the above teachings. For example, a die cutting electric discharge machine was depicted in the embodiment of the present invention, but the present invention can also be used in a wire-cut electric discharge machine. The above embodiment was selected for the purpose of explaining the essence and practical application of the invention. The scope of the invention is defined in the appended claims.

I claim:

1. An electric discharge machine for machining a workpiece by electric discharges in a machining gap formed between the workpiece and a machining electrode, comprising:
 a work tank for containing a machining fluid in which said machining gap is submerged;
 a machining fluid supply for introducing machining fluid containing a powdered material into said work tank;
 an agitator positioned in the work tank for agitating the machining fluid thereins to prevent settlement out of said powdered material;
 a magnetic adsorption filter positioned in the work tank to adsorb machining chips produced by said electrical discharges.

2. the electric discharge machine according to claim 1 wherein said agitatior creates a flow of machining fluid in said work tank and said magnetic adsorption filter is positioned facing the flow of machining fluid.

3. The electric discharge machine according to claim 1 wherein the magnetic adsorption filter substantially surrounds said workpiece about its sides.

4. The electric discharge machine according to claim 3 wherein said magnetic adsorption filter comprises a plurality of magnetic pieces vertically disposed in said work tank and extending to the proximate vicinity of the bottom of the work tank.

5. The electric discharge machine according to claim 3 wherein said magnetic adsorption filter comprises a retractable curtain suspended in said work tank and surrounding said workpiece, the bottom of said curtain extending essentially to the bottom of said work tank.

6. The electric discharge machine according to claim 1 wherein said machining fluid supply comprises a first machining fluid supply section for containing a machining fluid into which no powdered material has been added and a second machining fluid supply section for containing a machining fluid into which a powdered material has been introduced and a switching device for selectively admitting machining fluid to the work tank from either said first or said second machining fluid supply sections.

7. The electric discharge machine according to claim 6 wherein said agitator comprises at least one agitation blade disposed in said work tank and a controllable driver for activating said blade.

8. The electric discharge machine according to claim 1 wherein the magnetic adsorption filter includes a plurality of magnetic pieces and retainers for maintaining said magnetic pieces spaced apart and parallel to one another.

9. The electric discharge machine according to claim 1 wherein each of said plurality of magnetic pieces comprises a generally flat shape.

10. The electric discharge machine according to claim 8 wherein said magnetic pieces are selected from the group comprising permanent magnets and electromagnets.

11. The electric discharge machine according to claim 8 wherein said magnetic pieces comprise electromagnets and further comprising a controller to selectively energize and de-energize said elecromagnets.

12. The electric discharge machine in accordance with claim 8 wherein each of said plurality of magnetic pieces comprises a generally columnar shape.

13. The electric discharge machine according to claim 12 wherein said magnetic pieces comprise cylindrical, columnar-shaped electromagnets having cores formed of laminated silicon steel plate.

14. The electric discharge machine according to claim 8 wherein each of said plurality of magnetic pieces comprises an electromagnet having a core and wire wound on said core and further comprising a non-magnetic spacer positioned between adjacent electromagnets.

15. The electric discharge machine according to claim 8 wherein each of said plurality of magnetic pieces comprises a hollow, cylindrical member containing a removable permanent magnet.

16. The electric discharge machine according to claim 8 wherein each of said plurality of magnetic pieces comprises a non-magnetic, hollow, generally cylindrically-shaped sleeve, said sleeve containing a plurality of generally disc-shaped magnets stacked within said sleeve.

17. The electric discharge machine according to claim 16 wherein said generally disc-shaped magnets are selected from the group comprising electromagnets and permanent magnets.

18. The electric discharge machine according to claim 8 wherein each of said plurality of magnets comprises an elongated, pillar-shaped member comprising a hollow, elongated pillar-shaped casing and a plurality of magnets having alternating pole orientations stacked within said casing so that magnetic field lines are generated along the casing.

19. The electric discharge machine according to claim 18 wherein said plurality of stacked magnets are selected from the group comprising permanent magnets and electromagnets.

20. A method of electric discharge machining a workpiece using a tool electrode, the workpiece being positioned in a work tank containing a machining fluid into which a powdered material has been mixed, said method comprising the steps of:

agitating the machining fluid to prevent settling of said powdered material;

machining by creating electric discharges at a machining gap formed between said workpiece and said tool electrode to thereby create machining chips; and magnetically adsorbing the machining chips produced by said electric discharges in the work tank.

21. The method according to claim 20 further comprising the step of arraying a plurality of spaced apart elongated magnetic pieces substantially surrounding the sides of the workpiece, each of said magnetic pieces generating a magnetic field generally along its length, said spacing between adjacent magnetic pieces being selected so that the magnetic fields of adjacent magnetic pieces overlap.

22. The method according to claim 20 wherein the step of agitating creates a flow of machining fluid in the work tank and said method further comprises the step of positioning a magnetic adsorption filter facing the flow of fluid in the work tank.

23. The method according to claim 22 further comprising the step of positioning the magnetic adsorption filter to substantially surround the sides of the workpiece.

24. A method of electric discharge machining a workpiece using a tool electrode, the workpiece being positioned in a work tank for containing a machining fluid, said method comprising the steps of:

selectively introducing into the work tank either a machining fluid into which a powdered material has been mixed for finish machining or a machining fluid into which no powdered material has been added for machining other than finish machining;

agitating the machining fluid to prevent settling of the powdered material when machining fluid containing powdered material has been introduced into the work tank; and finish machining by creating electrical discharges at a gap formed between the workpiece and tool electrode to thereby create machining chips;

magnetically adsorbing, in the work tank, the machining chips produced by said finish machining.

* * * * *